(No Model.) 2 Sheets—Sheet 1.
D. R. RUPERT & W. H. WORST.
MOWING MACHINE.
No. 468,264. Patented Feb. 2, 1892.
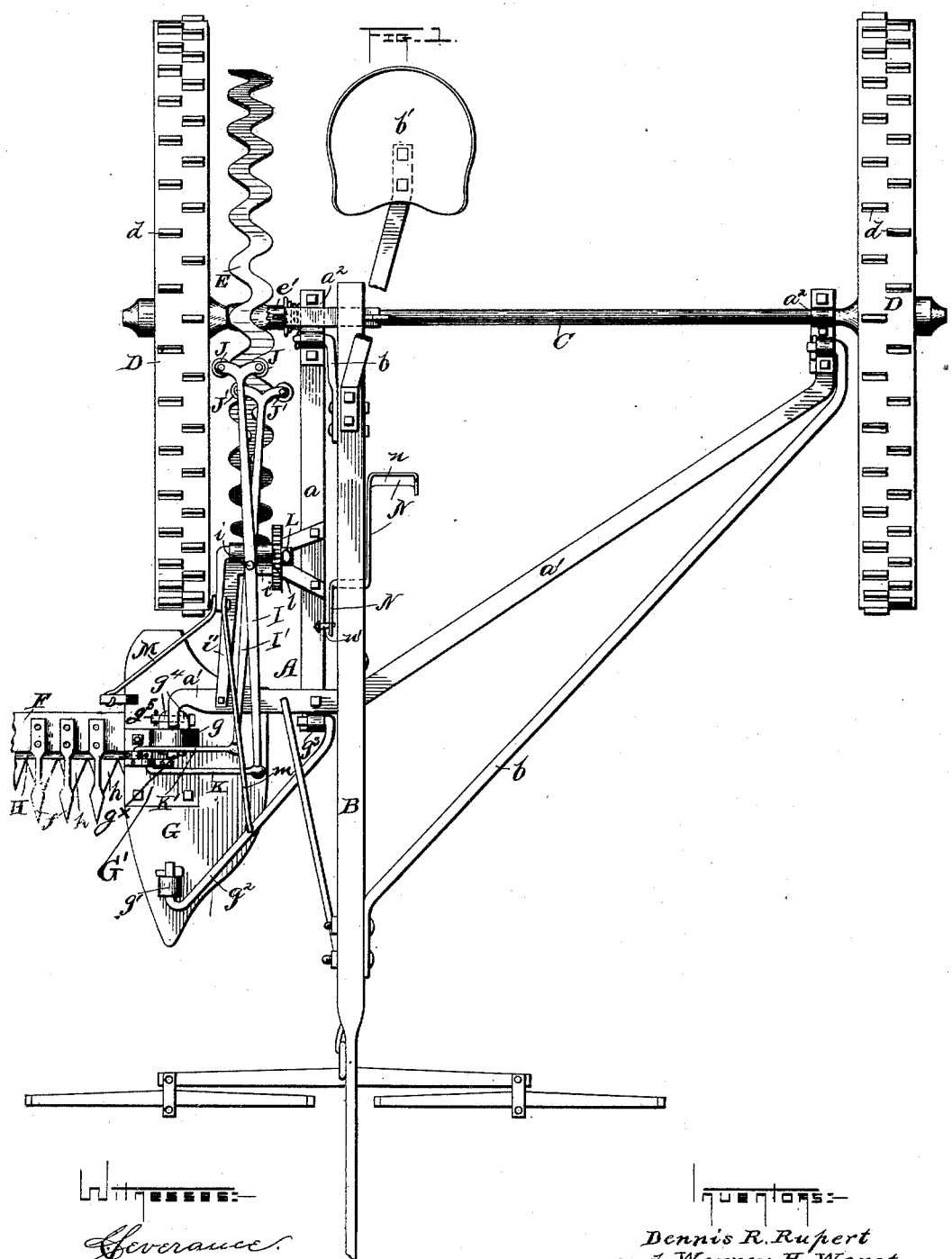
Witnesses:
Severance.
W. J. Barden.
Inventors:—
Dennis R. Rupert
and Warren H. Worst.
By L. Deane
their Attorney.

(No Model.) 2 Sheets—Sheet 2.
D. R. RUPERT & W. H. WORST.
MOWING MACHINE.
No. 468,264. Patented Feb. 2, 1892.
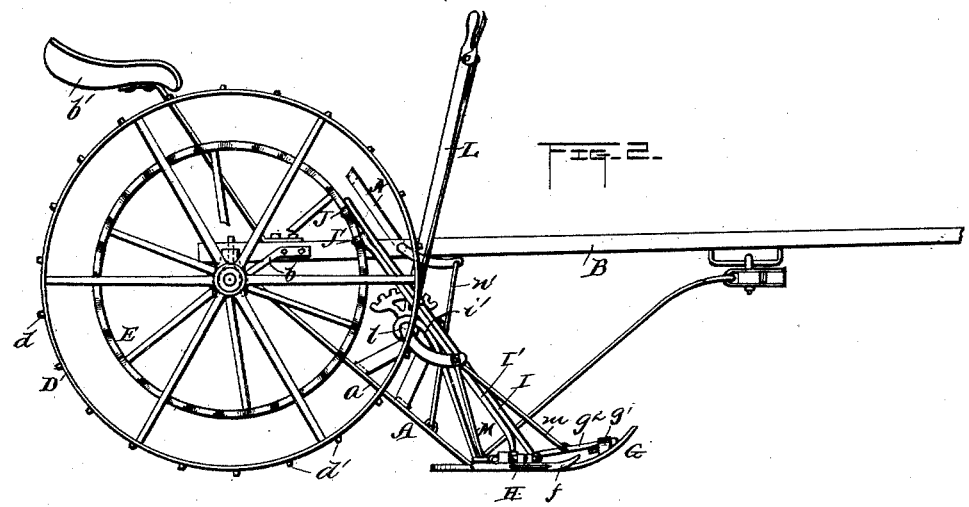
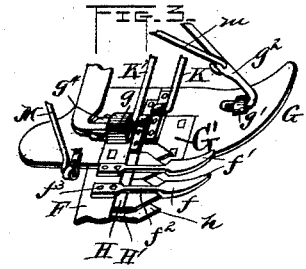
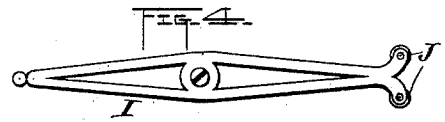
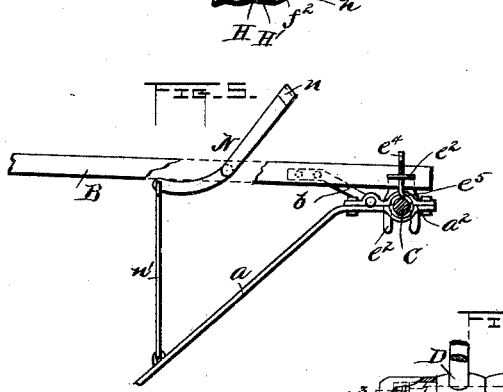
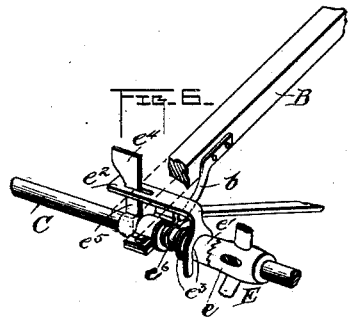
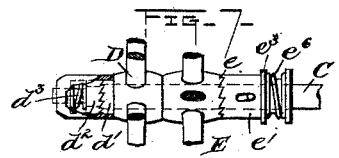
Witnesses:
Severance
W. J. Barden
Inventors:
Dennis R. Rupert,
and Warren H. Worst,
By L. Deane,
their Attorney.

ly upon its ends the conveyer-wheels

UNITED STATES PATENT OFFICE.

DENNIS R. RUPERT AND WARREN H. WORST, OF WILLIAMSPORT, NORTH DAKOTA.

MOWING-MACHINE.

SPECIFICATION forming part of Letters Patent No. 468,264, dated February 2, 1892.

Application filed March 19, 1890. Serial No. 344,529. (No model.)

*To all whom it may concern:*

Be it known that we, DENNIS R. RUPERT and WARREN H. WORST, citizens of the United States, residing at Williamsport, in the county of Emmons and State of North Dakota, have invented certain new and useful Improvements in Mowing-Machines; and we do hereby declare the following to be a full, clear, and exact description of the invention, such as will enable others skilled in the art to which it appertains to make and use the same.

The invention relates to improvements in mowing-machines of the class in which two reciprocating cutter-bars are used, the object being to provide means whereby the action of the machine may be rendered more rapid and efficient in severing the stalks of grain engaged between the oppositely-moving triangular knives of the cutter-bar and all jar or jolt of said bars when reversing motion may be obviated; and it consists in the construction, arrangement, and novel combination of parts hereinafter described, illustrated in the accompanying drawings, and pointed out in the claims hereto appended.

In the accompanying drawings, in which similar letters of reference indicate corresponding parts, Figure 1 represents a plan view of a machine embodying the invention. Fig. 2 represents a side view thereof. Fig. 3 represents a perspective view of the runner or shoe at the inner end of the guard-bar and the attachments to said shoe. Fig. 4 represents a face view of a modification of the cutter-bar-actuating levers. Fig. 5 represents a detail view of the foot-lever to lift the finger-bar. Fig. 6 represents a detail view of the piece passing through an opening in the heel of the tongue and serving to throw the operating-wheel in and out of gear. Fig. 7 represents a detail view of the ratchet and pawl and adjacent parts of one of the conveyer-wheels. Fig. 8 shows a detail face edge view of one of the guards or fingers.

Referring to the drawings by letter, A designates the frame of the mower composed of the bars $a$ $a'$, having bearings $a^2$ $a^2$ at their rear ends for the axle, and B designates the tongue attached to the bar $a$ of the frame by a rod $b$, which has its lower end bent and pivoted in the adjacent bearing-block $a^2$, attached to the bar $a$ and having the driver's seat $b'$ mounted on a standard rising from its heel.

C is the axle, journaled in the bearings $a^2$ and having upon its ends the conveyer-wheels D, provided on their peripheries with transverse lugs $d$ to prevent slipping. Upon the hubs of said wheels are circumferential ratchets $d'$, engaged by similar ratchets $d^2$, splined on the axle and forced into engagement with the ratchets $d'$ by the springs $d^3$, as shown, the said ratchets and springs forming couplings, by means of which the wheels are caused to rotate with the axle when moving forward, but are left to turn free thereon when backing.

E is an operating-wheel mounted on the axle between the heel of the tongue and the adjacent conveyer-wheel, and $e$ is a clutch, one section $e'$ of which is splined on the axle, while the engaging section is on the facing end of the hub of the wheel E. The wheel E has its rim laterally waved, corrugated, or bent in equal and similar curves inward and outward, for a reason hereinafter explained.

$e^2$ is a bar passing through a transverse opening in the heel of the tongue and with its outer end bent down and bifurcated, with the arms of said bifurcation resting against a circumferential shoulder $e^3$ on the boss or hub of the section $e'$ of the clutch $e$. $e^5$ is a bar, which is attached to the axle by having its lower end bent therearound so that the bar can turn thereon, which bar has a wedge-shaped head $e^4$ on its upper end to the inner side of the tongue, by means of which head, which passes through a slot in the bar $e^2$, the latter can be slid in, to disengage the sections of the clutch and throw the wheel E out of gear. When the tongue B is depressed, the bar $e^2$, that passes through its heel, is moved upward and the wedge-shaped head $e^4$ moves said bar and disengages the clutch $e$, and when the tongue is raised again the spring $e^6$ on the axle again engages the said clutch.

F is the finger-bar, having the guards or fingers $f$ secured thereto. The said fingers have the points $f'$ inclined at equal angles from their ends, as shown, the shanks $f^2$ and the heels $f^3$ straddling the finger-bar and secured thereto by bolts or rivets, as shown. The cutter bars and knives move in the slots or bifurcations $f^4$ of said fingers in opposite directions.

G is a runner or shoe, to which is bolted a plate G', upon which the finger-bar F is bolted at its inner end, and upon the plate G' is a lug $g$, within which is journaled a swivel-bolt $g^×$, having bars $g^4$, between which the apertured forwardly-projecting or bent end portion of the bar $a'$ of the main frame is received and through which and said lugs is inserted a pivot-bolt $g^5$. The link-bar $g^2$ is pivoted at its rearwardly bent or projecting end in a staple $g'$ on the shoe G, and having its laterally or outwardly projecting end pivoted in a staple $g^3$ on the bar $a'$ of the main frame in line with the pivot-bolt $g^5$.

H H' are two similar cutter-bars reciprocating in front of the finger-bar in the bifurcations of the fingers $f$ and provided with triangular knives or blades $h$, having cutting-edges on each side to shear the stalks of grain entering between them. The said cutter-bars are reciprocated in opposite directions by the following means:

I I' are similar levers, pivoted at the same point $i$ upon a bent bracket $i'$, connecting the bars $a$ $a'$ of the main frame. The rear arms of the levers I I' have opposite lateral lugs or extensions upon pins, depending from which are mounted anti-friction rollers J J', respectively, the said arms differing in length sufficiently to cause the anti-friction rollers J to engage against the operating-wheel E on each side thereof at the apex of an outward bend when the anti-friction rollers J' engage against said wheel at the apex of an inward bend thereof, and the reverse. Fig. 4 shows a modification of said levers, in which for the single shank are substituted two curved bars with a central pivotal block secured between them. This construction increases the strength and stiffness of the levers.

The width of the rim of the operating-wheel E varies in such manner that at whatever angle the levers I I' stand thereto during the vibrations of said levers the pairs of anti-friction rollers J J and J' J' will at all times bear on the opposite edges of said rim. The ends of the front arms of the levers I I' are respectively connected to the inner ends of the cutter-bars H H' by the link-bars K K'.

From the foregoing it is evident that the cutter-bars reciprocate oppositely, and as the blades of each bar are close to those of the other bar the two sets of blades will co-operate similarly to the blades of shears and will cut the stalks of grain that enter between them with the least possible exertion of force.

L is a lever-handle extending rearward to within easy reach of the driver's seat. The said lever is pivoted at $l$ upon the bracket $l'$, has its lower end bent frontward, and is connected at said lower end to the inner end of the shoe G by the link-rod M and to the bar $g^2$ by the link-rod $m$, so that the driver by turning said lever slightly backward can raise the points of the fingers, and by continuing said movement can raise the finger and cutter bars and fold them back out of the way, as described. The said lever is provided with the usual curved rack, detent, link-rod, and handle to hold it, and consequently the finger-bar, in the position in which they have been set by the driver. This is done when turning or driving to the field. The lever L by means of the link-rods M $m$ lifts the shoe G from the ground, folding it back at the same time, so as to raise the guard-bar also.

The levers I I' have their rear ends preferably only the distance of one-half bend of the rim of the operating-wheel E apart, so that the cutter-bars will be actuated by forces as nearly equal as possible, the length of leverage being in that case as near equal as possible to accomplish the result. The said bars will then cut the stalks of grain equally on each side and the necessary force will consequently be less.

N is a foot-lever pivoted to the tongue and having a transverse bar $n$ within easy reach of the driver's foot. The lower end of said lever is connected with the bar $a$ of the frame by a link-rod $n'$. By this means and the rod $b$ the driver can, by pressing forward on the lever N, raise the heel of the tongue and uncouple the clutch by means of the bars $e^2$ and $e^5$, hereinbefore described.

Having described our invention, we claim—

1. The combination, with the main frame, of the finger-bar, the shoe having the inner end of the finger-bar bolted upon it and pivoted at its rear to the main frame, the lever-handle pivoted on the main frame and having its lower arm bent frontward, the link-rod connecting said arm with the inner end of the finger-bar, and the link-rod connecting said arm with the pivoted link-bar connecting the front of the shoe and the main frame, substantially as specified.

2. The combination of the main frame, the shoe G, pivoted on the frontwardly-bent end of the bar $a'$ of the main frame by means of a swivel-bolt journaled in a lug on the shoe and having a pivot-bolt connection with said end of said bar, the finger-bar F, bolted at $g$ on the shoe, the lever L, pivoted to a bracket attached to the main frame and having a frontwardly-bent lower arm, the link-rod M, connecting said arm and the inner part of the finger-bar, the link-rod $g^2$, connecting the shoe and main frame, and the link-rod $m$, connecting the rod $g^2$ and the lower arm of the lever L, substantially as specified.

3. The combination, with the main frame, its axle, and conveying-wheels, the laterally-corrugated or waved wheel on said axle, the shoe pivoted on the main frame, the finger-bar bolted to said shoe, the levers I I', engaged by said corrugated wheel, and pitmen K K', connected to said levers and actuating the cutter-bars, of the lever L, link-rod $g^2$, connecting the shoe and main frame, and link-rods M $m$, respectively connecting the lever L with the finger-bar and the link-rod $g^2$, substantially as specified.

4. The combination, with the main frame having the bar $a$, the axle, the clutch $e$ on the axle, the tongue, and the bar $b$, secured at one end to the tongue and pivoted at the other end to the main frame, of the bar $e^2$, passing through an opening in the tongue, provided with a longitudinal slot near its inner end and having its outer end bent downward and bifurcated to engage the inner section of the clutch $e$, the bar $e^3$, mounted on the axle and provided at its upper end with a wedge-shaped head $e^4$, that enters the slot in the bar $e^2$, the lever N, pivoted to the tongue, and the link-rod $n'$, connecting said lever and the main frame, substantially as specified.

In testimony whereof we affix our signatures in presence of two witnesses.

DENNIS R. RUPERT.
WARREN H. WORST.

Witnesses:
H. A. ARMSTRONG,
FRANK HART.